(12) United States Patent
Villaret et al.

(10) Patent No.: US 9,632,167 B2
(45) Date of Patent: Apr. 25, 2017

(54) SOLAR TRACKER DEVICE AND SYSTEM

(76) Inventors: Gal Villaret, Tel Aviv (IL); Yves Villaret, Hadera (IL)

( * ) Notice: Subject to any disclaimer, the term of this patent is extended or adjusted under 35 U.S.C. 154(b) by 1144 days.

(21) Appl. No.: 13/394,342

(22) PCT Filed: Sep. 16, 2010

(86) PCT No.: PCT/IL2010/000761
§ 371 (c)(1),
(2), (4) Date: Apr. 19, 2012

(87) PCT Pub. No.: WO2011/033512
PCT Pub. Date: Mar. 24, 2011

(65) Prior Publication Data
US 2012/0327219 A1    Dec. 27, 2012

Related U.S. Application Data

(60) Provisional application No. 61/243,309, filed on Sep. 17, 2009, provisional application No. 61/383,344, filed on Sep. 16, 2010.

(51) Int. Cl.
*G01S 3/786* (2006.01)
*G01S 3/781* (2006.01)

(52) U.S. Cl.
CPC ............ *G01S 3/7861* (2013.01); *G01S 3/781* (2013.01)

(58) Field of Classification Search
None
See application file for complete search history.

(56) References Cited

U.S. PATENT DOCUMENTS

| 4,013,885 | A |   | 3/1977  | Blitz |
|-----------|---|---|---------|-------|
| 4,211,922 | A |   | 7/1980  | Vaerewyck |
| 4,242,580 | A |   | 12/1980 | Kaplow et al. |
| 4,564,275 | A |   | 1/1986  | Stone |
| 4,586,488 | A |   | 5/1986  | Noto |
| 4,691,075 | A |   | 9/1987  | Murphy |
| 5,796,499 | A | * | 8/1998  | Wenyon .......................... 359/15 |
| 6,899,096 | B2|   | 5/2005  | Nakamura |
| 7,115,851 | B2|   | 10/2006 | Zhang |

(Continued)

OTHER PUBLICATIONS

"Closed Loop Control of Heliostats". Tatiana Rubinov et al. Energy 29 (2004)905-913, Tel Aviv, Israel.

*Primary Examiner* — Frederick Bailey
(74) *Attorney, Agent, or Firm* — Edward Langer, Adv. Patent Attorney

(57) ABSTRACT

A solar tracker device continuously captures sun rays to be redirected towards a target The device includes a mirror defining a center point and fixedly mounted to a heliostat, an imaging device having an optical axis passing through the mirror center point, an electronic board, and a partly transparent dome extending between the imaging device and the target When sun rays penetrate said dome, the mirror reflects rays toward the dome and a portion are reflected back by the dome to the imaging device to form an image of the mirror center point An image of the fixed target is formed on the imaging device through the dome and defines an image of the target Whenever the images of the mirror and the target center are not in coincidence, the electronic board is activated to rotate the heliostat reflecting surface toward an orientation for which coincidence is obtained.

10 Claims, 5 Drawing Sheets

(56) References Cited

U.S. PATENT DOCUMENTS

| | | | |
|---|---|---|---|
| 7,207,327 B2 | 4/2007 | Litwin et al. | |
| 8,122,878 B1* | 2/2012 | Gross et al. | 126/600 |
| 2003/0142067 A1* | 7/2003 | Kurtenbach et al. | 345/156 |
| 2005/0229924 A1* | 10/2005 | Luconi et al. | 126/696 |
| 2007/0062195 A1* | 3/2007 | Walpita | 60/641.15 |
| 2008/0205031 A1* | 8/2008 | Chan-Wing | 362/17 |
| 2008/0236568 A1 | 10/2008 | Hickerson et al. | |
| 2009/0322745 A1* | 12/2009 | Zhang et al. | 345/420 |
| 2011/0259318 A1* | 10/2011 | Kinley | 126/573 |
| 2012/0092491 A1* | 4/2012 | Reznik et al. | 348/142 |

\* cited by examiner

SOLAR TRACKER DEVICE AND SYSTEM

The present application is based on and claims priority of US Provisional Patent Application No. 61/243,309, filed Sep. 17, 2009 and U.S. Provisional Patent Application No. 61/383,344, filed Sep. 16, 2010.

FIELD OF THE INVENTION

The present invention relates to a device and a system for automatic electronic sun tracking, and more particularly, to a device and a system for heliostat control.

BACKGROUND OF THE INVENTION

Heliostats are typically used to orient mirrors in systems to convert solar energy into useful energy, for example, electrical power, by reflecting sunlight onto a fixed target. Their orientation is adjusted by means of a mechanical system allowing the rotation of the mirror generally around two axes of rotation. The rotation is typically activated by motors and gears. These motors are controlled by solar trackers that calculate the required position of the heliostat in order to provide adjustment information needed by the system to assure constant reflection of the sunlight onto the fixed target while the relative position of the sun changes during the course of a day.

Whenever a number of such heliostats are used to reflect the sunlight onto the same target, then a considerable amount of energy is concentrated onto a relative small area of the target, and this energy can be efficiently used to provide usable energy. For example, a steam engine coupled to a generator or an array of photocells can be used to produce electrical energy. The high concentration of energy on the target allows the higher efficiency of energy conversion devices, thus reducing the cost of the system. However, this cost reduction is compensated for by the cost of the heliostats. Thus it is advantageous to reduce the cost of heliostats.

The cost of the motors, gears and motion controllers constitutes a significant part of the total heliostat cost. Motors should be controllable, like adding steppers, but this requires an associated costly controller. Gears should be without backlash and linear, i.e., should provide a linear relation between the rotation of a particular motor driveshaft and the amount and angle of rotation of an associated heliostat around a corresponding rotation axis.

Many prior art heliostat systems using stepper motors need adjustments during set-up, since their rotation angle is commanded incrementally, and not by absolute position. This means that each heliostat must be provided with an individual reference point mechanism. This requirement generally entails additional expense, especially, additional calibration costs at installation.

Furthermore, this calibration often needs to be re-done periodically in order to avoid an eventual accumulation of small errors. Such small errors can be due to command noise, imprecision of gears, slight movement of the heliostat base, or some rare failure of the stepper motor to execute a commanded increment. Such a periodic re-calibration also adds operating costs to a solar plant.

Thus there is a need for a solar tracker device and system that is accurate, simple to operate, needs no adjustment, and that is cost-effective.

SUMMARY OF THE INVENTION

Accordingly, it is a broad object of the present invention to overcome the above disadvantages of the prior art and to provide a solar tracker which is able to control a simpler heliostat. The motors do not need to be position-controlled and can be used in simple forward, stop and reverse command modes. The gear can be of any type, and does not need to be linear. The solar tracker device of the present invention does not need precise adjustment, and no periodical re-adjustment is required.

It is convenient to define a center point of the fixed target, which is a virtual point in space toward which the heliostat is oriented to reflect the sun rays so that a maximum of them will hit the fixed target.

It is an object of the present invention to provide a solar tracker whose accuracy is substantially not affected by changes in the position of the heliostat rotation axes.

It is another object of the present invention to provide a device that allows for the manufacture of a lower-cost heliostat system.

According to an aspect of the present invention, there is provided a solar tracker device associated to a heliostat having a reflecting surface to reflect sun rays onto a fixed target, the solar tracker device comprising:

a mirror with a pre-defined shape fixedly mounted parallel to the heliostat reflecting surface, the pre-defined shape defining a mirror center point;

an imaging device having an optical axis passing through the mirror center point; and a dome extending between the imaging device and the mirror on one side and the sun and the fixed target on a second side, such that when sun rays penetrate the dome, the mirror substantially reflects back these sun rays toward the dome and a portion of these sun rays are reflected back by the dome to the imaging device forming an image of the mirror, the shape of this image defining a) an image of the mirror center point; and an image of the fixed target is formed on the imaging device through the partly transparent dome, defining b) an image of the target center point, such that the coincidence of a) the image of the mirror center point and b) the image of the target center point corresponds to the desired orientation of the heliostat reflecting surface in order to reflect the sun rays onto the fixed target.

According to another aspect of the present invention, there is provided a solar tracker system for controlling the orientation of a heliostat, the system comprising:

a heliostat having a reflective surface, the reflective surface being movable along at least two axes of rotation to define an orientation with respect to the sun, and a tracking device having a mirror mounted parallel to said reflective surface, an imaging device, and a diffracting element positioned between the imaging device and mirror on one side and the sun and a fixed target on a second side, wherein images formed on the imaging device from reflections off the diffracting element and from light emanating from the fixed target are used by the tracking device to control the orientation of the reflective surface of the heliostat.

According to yet another aspect of the present invention, there is provided a method for positioning a heliostat for tracking the sun, the method comprising:

obtaining an image of a mirror reflecting sunlight at a fixed target, calculating a position of a center of the image of the mirror;

obtaining an image of the fixed target;

calculating a position of a center of the image of the fixed target;

calculating a length and orientation of a vector joining the mirror center image to the fixed target center image;

calculating an amount of rotation and a direction of at least one motor to change the orientation of the mirror so that the length of the vector is reduced; and driving the at least one motor in the calculated direction and by the calculated amount of rotation;

wherein the length of the vector is substantially reduced and the images of the mirror center and fixed target center are substantially coincident.

The solar tracker device of the present invention is mounted on or connected to an electronic board which comprises a frame grabber to capture images from the imaging device. There is also provided a central processing unit for calculating the relative positions of the image of the mirror center point and the image of the target center point from captured images of both the mirror and the fixed target in an imaging area of the imaging device. In a preferred embodiment of the present invention, there are two output units for activating motors to orient the heliostat reflecting surface in two axes in relation to the continuously changing position of the sun.

The frame grabber captures both the fixed target image and the mirror image, the central processing unit calculates the relative positions of the images of the target center and the image of the mirror center point for coincidence and directs the at least a pair of output units to periodically activate the output units to orient the heliostat reflecting surface so as to reflect the sun rays onto the fixed target.

The solar tracker device of the present invention includes an imaging system and a mirror surface parallel to the reflective heliostat surface. Also included is a transparent dome covering both the imaging system and the mirror and a central processing unit (CPU). The covering dome, in a preferred embodiment of the present invention, is mainly made of transparent material having a small concentration of diffracting particles. Sun rays entering the dome are reflected by the mirror back to the dome surface, and a small amount of rays are diffracted. Some of the diffracted rays reach the imaging system, forming an image of the mirror surface.

The CPU executes an image processing algorithm and then identifies a) the image of the fixed target seen through the dome, and b) the reflected image of the mirror. The CPU image-processing algorithm also calculates the position on the imaging area of the imaging device of a pre-defined reference point of the image of the fixed target (hereinafter called "target center point") and also the position on the imaging area of the imaging device of a pre-defined reference point of the mirror image (hereinafter called "mirror center point"). These reference points of the target and the mirror are pre-defined so that the coincidence of their images on the imaging device corresponds to the desired orientation of the heliostat.

The CPU then activates the motor output units according to the relative positions of the images of a) the fixed target center and b) the mirror center point in the appropriate direction in order to reach a coincidence between them. Whenever coincidence is obtained, the motor output units are set to stop the motors, and the heliostat is set in the desired position where sun rays are reflected onto the fixed target.

In a preferred embodiment of the present invention, the mirror has a ring shape, and the center of the ring is the mirror center point and the target reference point in the image of the fixed target is the target center point.

It is an advantage that the accuracy of the solar tracker is substantially not affected by changes in the position of the heliostat axes. For example, if the heliostat is mounted on a base anchored to the ground, movements of the ground due to heat or humidity and rain will have little or no affect on the tracking accuracy. As mentioned heretofore, many conventional heliostats must be adjusted periodically in order to compensate for small deviations, whereas the present invention dispenses with any need for adjustments of this type. Furthermore, the foundation needed to fix a heliostat can be simplified since stability is not an essential requirement, thus foundation costs can be substantially reduced.

Another advantage is that the solar tracker of the present invention does not need tracking calibration. By way of example, before installation, an image of the fixed target is loaded into the CPU memory, and this image is used by a pattern recognition algorithm of the CPU. This eliminates the costly calibration needed with conventional heliostats.

A further advantage is that heliostat motors do not need to be position-controlled. They only need Forward, Reverse and Standstill activation. This eliminates the need for expensive motor motion controllers, and simple output units, like bidirectional switches, can be used with DC motors to connect them to a DC power supply in the appropriate direction. For example, it allows the use of a small photovoltaic panel fixed to the heliostat in order to provide power to the solar tracker and the motors. In such a case, no electrical cables are needed for power or control of the heliostat, resulting in further, significant cost reduction of the power plant.

Yet another advantage of the present invention is that it is not sensitive to dust, scratches and other defects on the dome. Heliostats are generally exposed to dust, wind and rain, but in a preferred embodiment of the present invention, sensitivity and precision in orientation are not affected by these factors. This is due to the fact that the image of the mirror is returned by the diffracting particles of the dome, and the dust deposed on the dome would simply play the same role as these diffracting particles.

Still another advantage of the present invention is that it is not sensitive to the accuracy of the image sensing device. This is due to the fact that both images of mirror and target are formed, whenever coincidence is obtained, on the same area of the imaging device, so that optical distortions and/or image sensor inaccuracy do not generate offset errors.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF PREFERRED EMBODIMENTS

Figure 1:
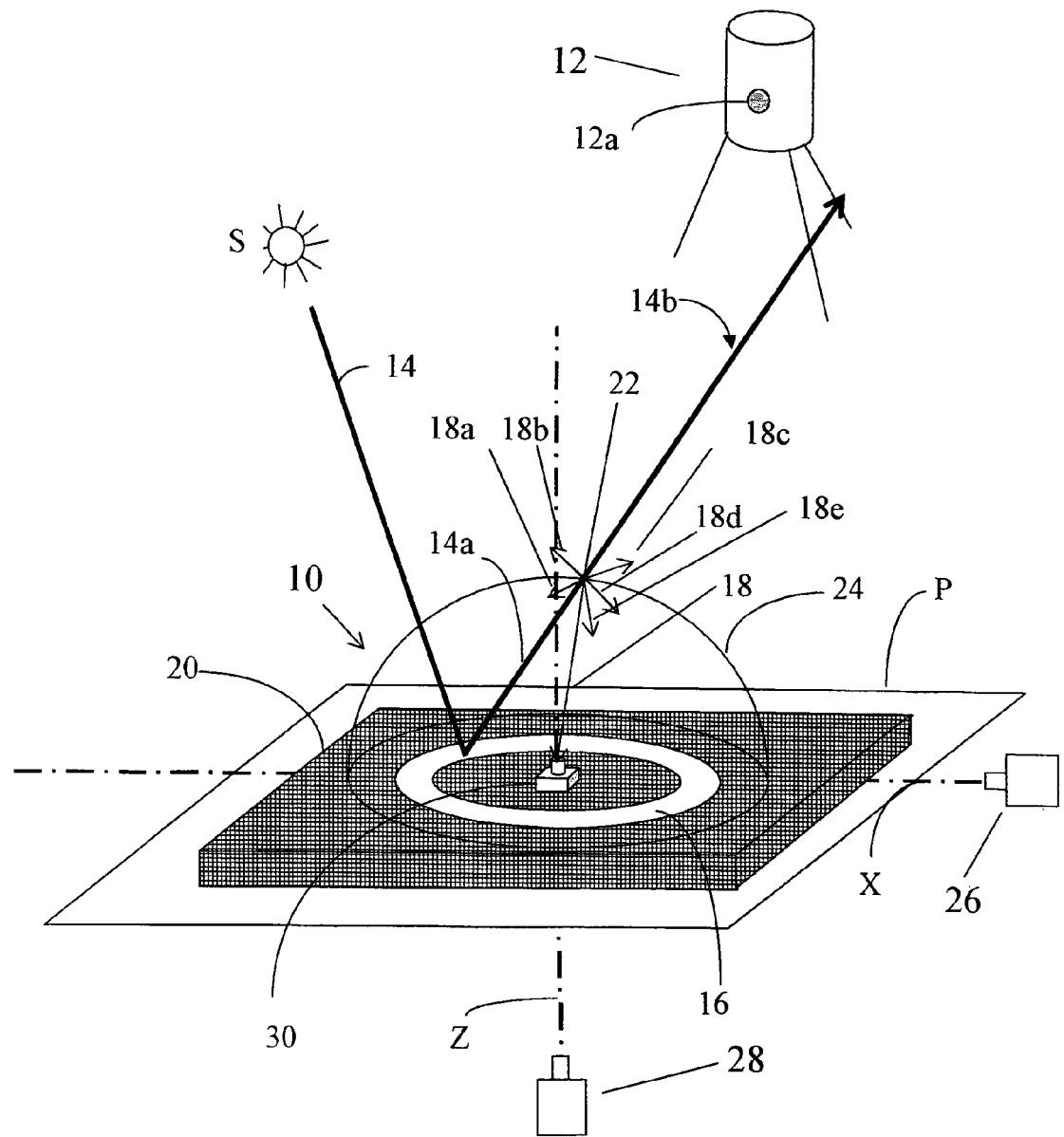
FIG. 1 is a general view of a preferred embodiment of the system of the present invention.

FIG. 1 is a general view of a preferred embodiment of the system of the present invention. Referring now to FIG. 1, there is depicted an embodiment of a solar tracker 10 mounted on a reflective surface P of a heliostat. In this figure, for clarity of the drawing, the reflective surface P is shown only slightly larger than the solar tracker, however in a real system it will be considerably larger. The solar tracker 10 includes a planar ring-shaped mirror 16 fixedly positioned parallel to the reflecting surface P of a heliostat, an imaging device 30, and a diffracting element or dome 24 covering the imaging device and mirror. Imaging device 30 is mounted on an electronic board 20 (see also FIG. 2). The optical axis of the imaging device is set perpendicular to the mirror surface plane and intersects that plane at the mirror center point coincident with rotation axis Z. Also shown is a fixed target 12 having a reference center point 12a.

In FIG. 1, the reflective surface P of the heliostat is schematically shown being rotatable around two rotation axes X and Z utilizing two motors 26, 28, respectively. Rotation axis Z is a primary axis and axis X is secondary, i.e., when a heliostat is rotated around axis Z, axis X is also rotated around axis Z. In the particular arrangement of FIG. 1, axis Z is substantially vertical, and axis X is substantially horizontal. It will be understood that the heliostat may have different arrangements of rotation axes. In some embodiments, an arrangement of three axes of rotation controlled by three motors may be used.

In operation, by way of example, a sun ray 14 from sun S is shown going through dome 24 and hitting mirror 16. The reflected ray 14a hits dome 24 at an intersection point 22 and part of its energy continues along the same path outside dome 24, as indicated by ray 14b.

In another aspect, at the intersection point 22 of the reflected ray 14a with dome 24, a small amount of the optical energy of the ray is diffracted by the diffracting particles included in the dome material, generating light rays 18a to 18e, in all directions (shown by short arrows). Some of these rays 18a to 18e, such as ray 18 reach imaging device 30. A plurality of rays, like ray 18, form on the imaging device 30 an image of the area of dome 24 which is illuminated by rays reflected by mirror 16. Since rays emitted by the sun S are approximately parallel, the shape of the illuminated area of dome 24 forms a projection of the shape of mirror 16 in the direction of the reflected rays. Whenever focal distance of imaging device 30 is small compared to the radius of dome 24, then it can be shown that the image on image device 30 has the form of a projection of the mirror shape on a plane parallel to the focal plane of imaging device 30. In this way, a first image of mirror 16 is captured by imaging device 30.

In another aspect, fixed target 12 and surrounding scene is illuminated by ambient daylight and emits rays that traverse dome 24 and reach imaging device 30 to form an image of fixed target 12 on imaging device 30 captured through the partly transparent dome 24.

In a preferred embodiment of the present invention, dome 24 is made to diffract part of the rays hitting it by means of small particles included in the dome material, such as, for example, titanium dioxide particles included in a polymer plastic. According to some embodiments of the present invention, the material of dome 24 includes a small concentration of such diffracting particles. The concentration of these particles is set sufficiently low in order to make the dome 24 partly transparent. It will be understood that other ways of making dome 24 partly transparent and partly diffracting can be used. For example, a mesh grid pattern could be applied on the dome. In another example, the dome could be a grid made of woven metal wires.

In a preferred embodiment of the present invention, dome 24 is shown having a hemispherical shape. In will be understood that other shapes can be used, as long as dome 24 extends between imaging device 30 on one side, and the sun S and fixed target 12 on the other side.

It will be understood that mirror 16 can be formed with various contour shapes as long as the shape provides a way of calculating a center point. In the embodiment of the present invention illustrated in FIG. 1, the mirror surface is planar, although a non-planar surface could also be used. For example, mirror 16 could be concave, resulting in light concentration. In this case, the dome area illuminated by rays reflected by such a concave mirror would be smaller than the area of the mirror itself. This would result in higher luminosity of this illuminated area, and have an added advantage of increasing the contrast of the mirror image on imaging device 30 and thus increasing the precision of the pattern recognition algorithms used by the system of the present invention.

Figure 2:
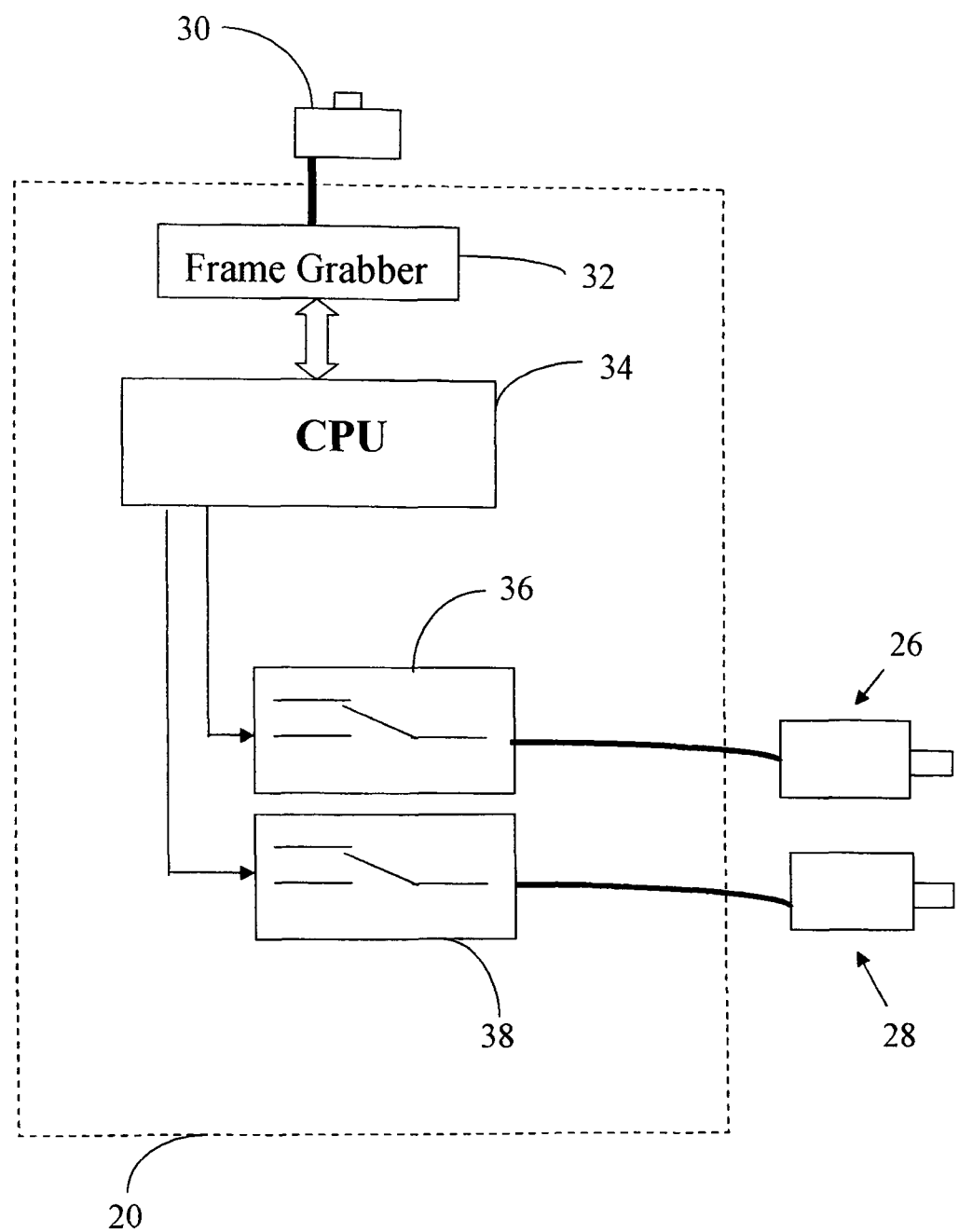
FIG. 2 is a block diagram showing the main electronic components of the solar tracker in accordance with the principles of a preferred embodiment of the present invention.

FIG. 2 is a block diagram showing the main electronic components of the solar tracker in accordance with the principles of a preferred embodiment of the present invention.

Referring now to FIG. 2 in detail, there is shown the main electronic components of solar tracker 10 comprising: a frame grabber 32 used to store in memory images captured by image sensor 30, a central processing unit (CPU) 34, and two output units 36, 38 which are controlled by CPU 34 in order to activate the motors 26, 28 respectively to operate solar tracker 10. Standard cables (shown by dark lines), as are known to those skilled in the art, are used to connect image sensor 30 to frame grabber 32 and to connect output units 36,38 with their respective motors 26, 28.

In FIG. 2, the two output units 36 and 38 are shown as simple relay switches, thus illustrating the low cost of implementation of the present invention. As mentioned hereinbefore, most known heliostat tracking controllers in the prior art require a costly position controller to drive the motors.

Both images of mirror 16 and fixed target 12, formed on imaging device 30 (see FIG. 1), are captured by frame grabber 32. CPU 34 then executes an image processing algorithm, as is known to those skilled in the art, which determines the positions of a) an image of fixed target 12, and b) an image of mirror 16 (see FIG. 1). According to their relative position, a CPU program (described hereinafter) calculates the direction in which the motors should be activated in order to reduce the distance between images of mirror center point and target center point. The two output units 36 and 38 are then activated in order to run motors 26 and 28 in the calculated direction. This program is run cyclically, so that the distance (D) between images of target center point 48 and mirror center point 40 (see FIG. 3) is progressively reduced until coincidence is obtained. Whenever coincidence is obtained, output units 36 and 38 are set by the CPU program to stop motors 26, 28. As mentioned hereinbefore, the coincidence of these two center point images corresponds to the desired position in which sun rays 14 (see FIG. 1) are reflected by heliostat reflecting surface P so as to be redirected toward fixed target 12 to illuminate its surface.

Figure 3:
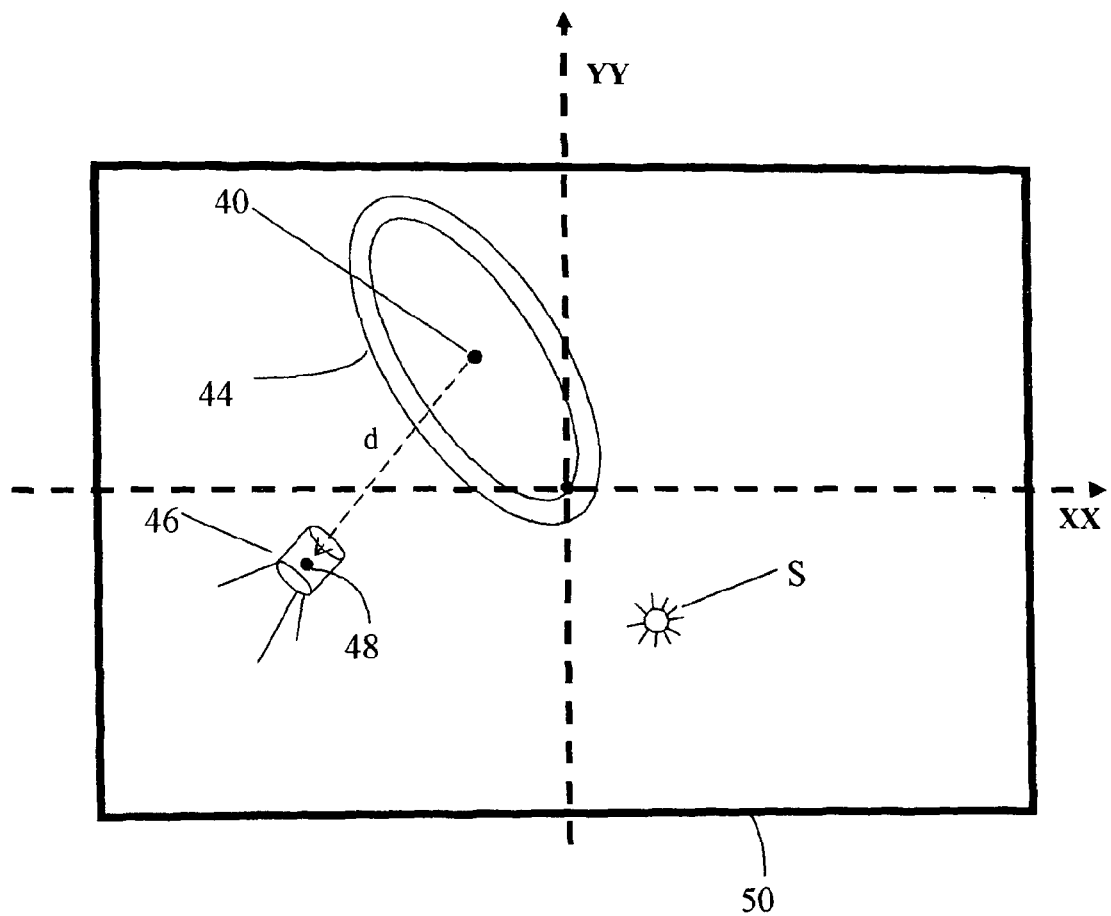
FIG. 3 schematically shows the shape of the images formed on the imaging device for a given position of the sun.

FIG. 3 schematically shows the shape of the images formed on the imaging device for a given position of the sun.

An imaging area 50 of imaging device 30 has two axes XX and YY. In a preferred embodiment of the present invention, axis XX is set parallel to the X axis of rotation of the heliostat. It will be understood that this particular orientation of axis XX has been chosen in order to simplify the description of the orientation algorithm, but any orientation could be chosen.

Image of the target center point 48 is not necessarily a real image, but it may be a virtual point whose coordinates are calculated by the image processing algorithm applied to the data captured from fixed target image 46. Hereinafter, the term "image of the target center point" refers to such a virtual point.

So too, image of the mirror center point 40 is not a real image, since mirror 16 (see FIG. 1) has a ring shape and its center is not a reflecting surface, but it is a virtual point whose coordinates are calculated by the image processing algorithm applied to the data captured from mirror image 44. Hereinafter, the term "image of the mirror center point" refers to such a virtual point.

In the example of the images shown in FIG. 3, the shape of mirror image 44, is depicted as an elliptical ring. The position of imaged mirror center point 40 of this elliptical image is calculated by CPU 34 (see FIG. 2). Fixed target image 46 is also shown. The position of the imaged target center point 48 is also calculated by CPU 34. In the preferred embodiment of the present invention illustrated in FIG. 3, the symmetrical features of the mirror shape simplify the pattern recognition algorithm executed by CPU 34.

An image processing algorithm processes the data from mirror image 44 and calculates the position of the imaged mirror center point 40. Another image processing algorithm processes the data from fixed target image 46 and calculates the position of the imaged target center point 48. A distance "d" (shown in FIG. 3) can be defined as the distance between the calculated center points 40 and 48. These calculations are done using pattern recognition and machine vision algorithms as are known to those skilled in the art.

The calculated positions coordinates of the image of the mirror center point and the image of the target center point are processed to define the movement direction of the motors required to reduce the distance "d" between these two reference points.

It will be understood that various algorithms as are known to those skilled in the art can be defined to select the appropriate directions of rotation needed to move the heliostat toward the desired orientation.

The program run by the CPU (see FIGS. 2 and 4) thus selects Forward, Backward, or Standstill commands for both motors 26, 28 (see FIG. 2) and activates or de-activates them accordingly by regulating the respective output units 36, 38 (see FIG. 2). The CPU program algorithm selects the proper activation of motors 26, 28 in order to reduce the distance between a) image of the mirror center point 40 and b) image of the target center point 48.

The CPU program runs in a cyclical way, so that the distance between the imaged mirror center point 40 and imaged target center point 48 progressively reduces until it is minimized, at or close to zero, and the two points substantially coincide. Whenever the sun S position in the sky slowly changes, the coincidence condition is lost, and the CPU program immediately communicates a correcting action to output units 36, 38 (see FIG. 2), which activate their respective motors 26, 28 and thus restores this coincidence.

As explained hereinbefore, coincidence corresponds to the desired orientation of the heliostat surface P. Solar tracker 10, in a preferred embodiment of the present invention, is thus capable of continuous control of the heliostat motors 26, 28 (see FIG. 2) in order to reflect the sun rays 14 (see FIG. 1) onto fixed target 12 (see FIG. 1).

Figure 4:
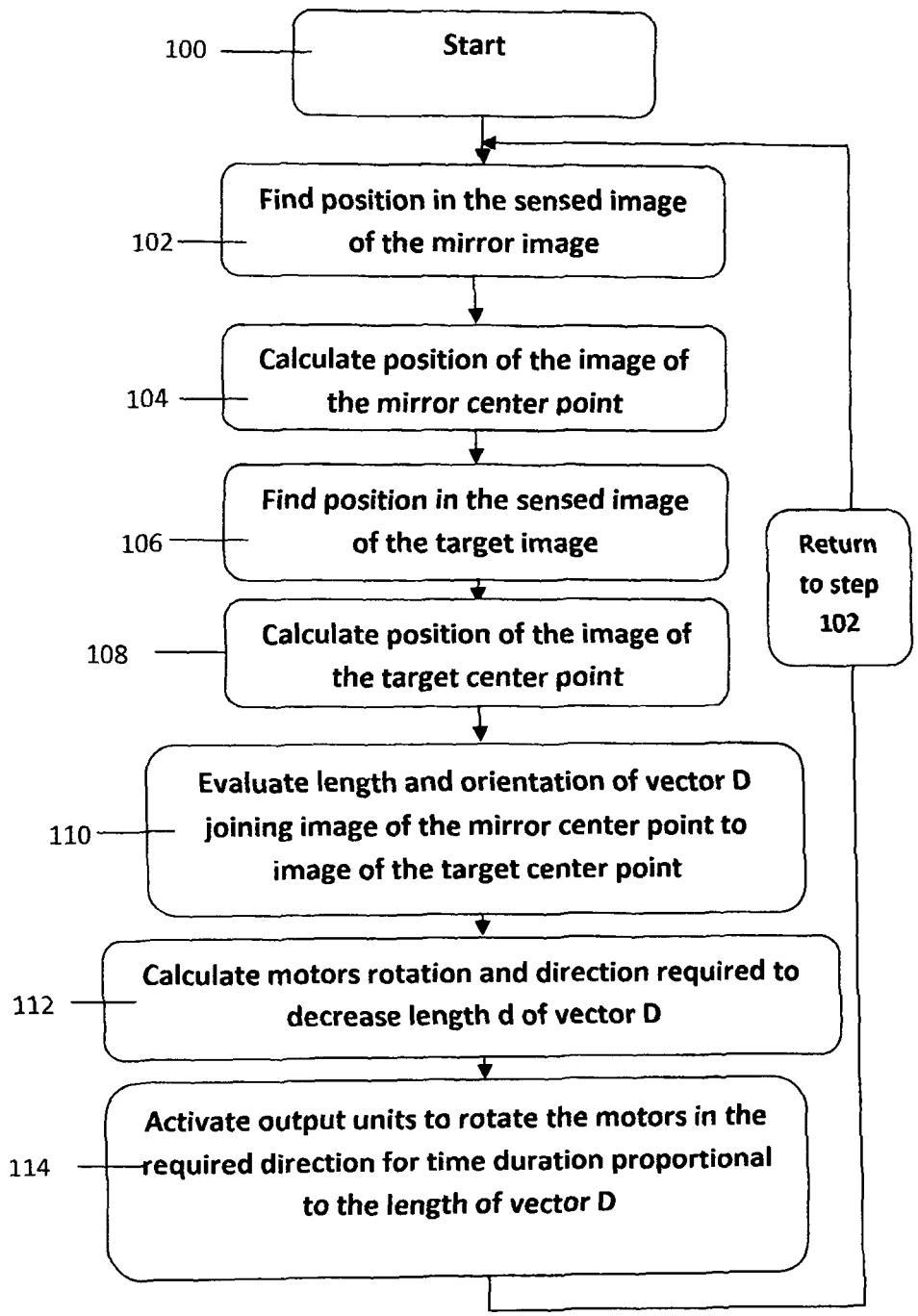
FIG. 4 is a block diagram of a method of positioning a heliostat, consistent with an embodiment of the present invention.

FIG. 4 is a block diagram that illustrates the method of positioning a heliostat, according to some embodiments of the present invention. The method can be implemented by a computer program such as that discussed above. Upon starting at module 100, in module 102 the system locates the position of image 44 of mirror 12. In module 104 the position of mirror center point image 40 is calculated. Subsequently, in module 106 fixed target image 46 is determined, and in module 108 fixed target center point image 48 is calculated.

A vector "D" having distance "d" and an orientation in space is then determined in module 110. In some embodiments, the length and orientation of the vector is that which connects mirror center point image 40 to fixed target center point image 48. In module 112 the direction and extent of motor rotation that would have the effect of decreasing the length of vector D is calculated. This information is then used in module 114 to activate output units 36 and 38, to cause the motors to rotate for an appropriate time and in an appropriate direction to obtain coincidence of center points 40 and 48. Control then returns to module 102, to repeat the process so that accurate tracking is maintained as the position of the sun changes.

It is particularly advantageous that the tracking accuracy is not affected by the dome shape precision. In the embodiment of the present invention shown in FIG. 1, the coincidence, when the heliostat surface P is oriented in the desired direction, of imaged target center point 48 and imaged mirror center point 40 (see FIG. 3) is determined by the precision of the centering of mirror 16 relative to the optical axis of imaging device 30, and not by the dome shape. Ensuring this centering is easily done during manufacturing, and thus does not require high-cost manufacturing. The dome can be made of low cost polymer, as explained heretofore (see FIG. 1), since its shape does not require high precision.

Figure 5:
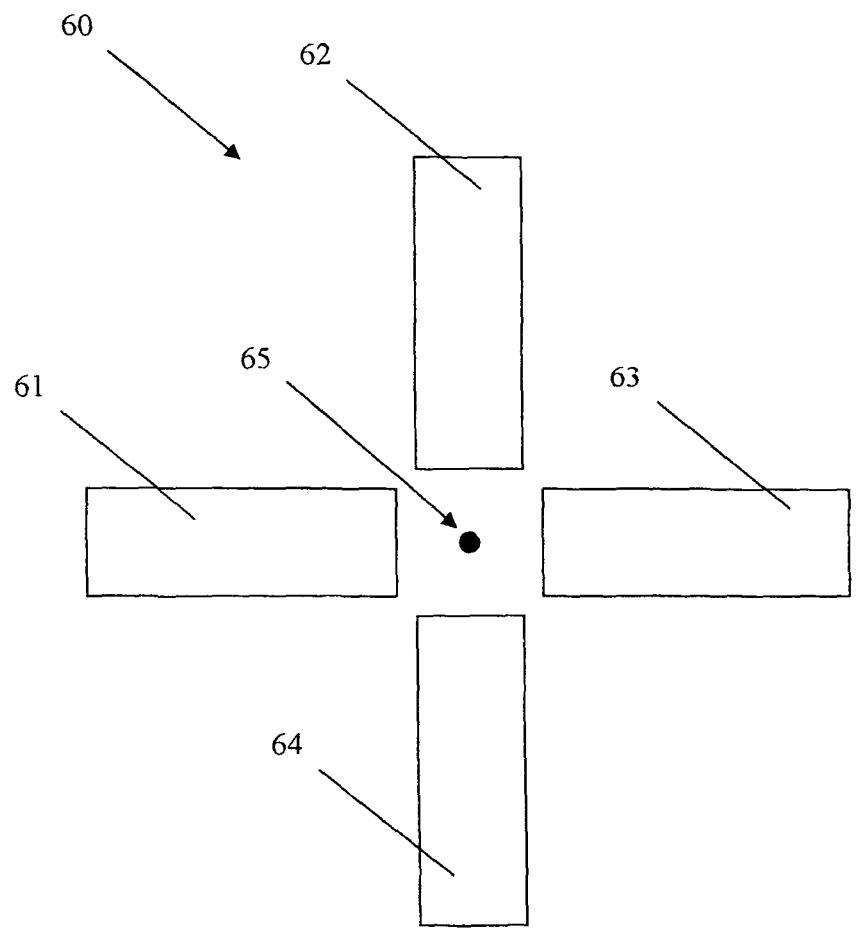
FIG. 5 shows an example of another embodiment of a mirror shape usable in a solar tracker in accordance with the principles of the present invention.

FIG. 5 shows an example of another embodiment of a mirror shape usable in a solar tracker in accordance with the principles of the present invention. In this example, mirror 60 is composed of four rectangular mirrors (61 to 64) symmetrically disposed around a central point 65.

The fixed target of a solar plant may have various shapes; in some cases it may be that the pattern recognition algorithm needed to locate the target image on the imaging device sensing area becomes too complex. According to some embodiments of the present invention CPU 34 may be low-cost. However, if the required pattern recognition becomes too complex, a low-cost CPU may not be sufficient to implement the required pattern recognition algorithm. In that case, it is possible to associate to the fixed target 12 (see FIG. 1) known objects fixed at pre-defined distances from fixed target 12, these objects being designed to ease the computational load on the pattern recognition algorithm used. For example, flashing lights (not shown), blinking at a regular rate, can be placed substantially above and under fixed target 12. These almost punctual light sources can be easily located by imaging device 30, and the data collected easily processed by an image processing algorithm. The imaged target center point 48 can then be calculated by its relative position with these flashing lights.

Having described the present invention with regard to certain specific embodiments thereof, it is to be understood that the description is not meant as a limitation, since further modifications may now suggest themselves to those skilled in the art, and it is intended to cover such modifications as fall within the scope of the appended claims.

The invention claimed is:

1. A solar tracker device for controlling the orientation of a heliostat reflecting surface along two axes of rotation so as to continuously capture available sun rays to be redirected towards a fixed target having a target central point, said solar tracker device comprising:
    a mirror with a pre-defined shape fixedly mounted parallel to said heliostat reflecting surface, said pre-defined shape defining a mirror center point;
    an imaging device having an optical axis passing through said mirror center point, said imaging device being connected electronically to an electronic board; and
    a partially transparent and partially reflective dome extending between the imaging device and the mirror on one side and the sun and the fixed target on a second side,
    such that when sun rays penetrate said dome, said mirror substantially reflects back these sun rays toward said dome and a portion of these sun rays are reflected back by said dome to said imaging device to form an image of said mirror whose shape defines an image of said mirror center point, and
    such that an image of the fixed target is formed on the imaging device through the partly transparent dome and defines an image of said target center point, and
    wherein the solar tracker device is mounted on the heliostat surface, and
    wherein whenever said images of said mirror center point and said target center point are not in coincidence, said electronic board is activated to rotate said heliostat reflecting surface toward an orientation for which coincidence of said images is obtained.

2. The solar tracker device of claim 1, wherein said electronic board comprises:
    a frame grabber to capture images from said imaging device;
    a central processing unit for calculating the relative positions of said mirror center point and said target center point in relation to said reference point from captured images of said mirror and said fixed target in an imaging area of said imaging device; and
    at least a pair of output units for activating motors to orient said heliostat reflecting surface in two axes in relation to the continuously changing position of the sun,
    such that when said frame grabber captures said fixed target image and said mirror image, said central processing unit calculates the relative positions of the image of said target center point and the image of said mirror center point, directs said at least a pair of output units to periodically activate said output units to orient said heliostat reflecting surface so as to reflect the sun rays onto said fixed target.

3. The solar tracker device of claim 1, wherein said dome is formed from partly transparent and partly diffractive material.

4. The solar tracker device of claim 3, wherein said material is polymer plastic including a given concentration of diffractive particles.

5. The solar tracker device of claim 1, wherein said dome is a transparent dome on which surface a grid is applied.

6. The solar tracker device of claim 1, wherein said dome is a grid.

7. The solar tracker device of claim 1, wherein said mirror is concave, concentrating the sun rays and increasing the contrast of said mirror image.

8. The solar tracker device of claim 1, wherein said imaging device captures an image of at least one reference object disposed at a fixed pre-defined position relative to said target center.

9. The solar tracker device of claim 8, wherein said at least one reference object comprises a flashing light device.

10. A method for positioning a heliostat for tracking the sun using a solar tracking device, the method comprising:
    obtaining, an image of a mirror reflecting sunlight at a fixed target;
    calculating a position of a center point of the image of the mirror;
    obtaining an image of the fixed target;
    calculating a position of a center point of the image of the fixed target;
    wherein the solar tracker device is mounted on the heliostat surface,
    wherein the solar tracking device has a partially transparent and partially reflective dome extending between said imaging device and the mirror on one side and the sun and the fixed target on a second side,
    such that when sun rays penetrate said dome, said mirror substantially reflects back these sun rays toward said dome and a portion of these sun rays are reflected back by said dome to said imaging device to form said image of said mirror whose shape defines said image of said mirror center point, and
    such that an image of the fixed target is formed on said imaging device through said partly transparent dome and defines said image of said target center point,
    calculating a length and orientation of a vector joining the mirror center point image to the fixed target center point image;
    calculating an amount of rotation and a direction of at least one motor to change the orientation of the mirror so that the length of the vector is reduced; and
    driving the at least one motor in the calculated direction and by the calculated amount of rotation;
    wherein the length of the vector is substantially reduced and the images of the mirror center point and fixed target center point are substantially coincident.

* * * * *